United States Patent
Wiszniewski et al.

(10) Patent No.: US 7,996,116 B2
(45) Date of Patent: Aug. 9, 2011

(54) METHOD OF DETERMINING VOLTAGE STABILITY MARGIN FOR LOAD SHEDDING WITHIN AN ELECTRICAL POWER SYSTEM

(75) Inventors: Andrzej Wiszniewski, Wroclaw (PL); Waldemar Rebizant, Wroclaw (PL); Andrzej Klimek, Surrey (CA)

(73) Assignee: Areva T & D UK Limited, Stafford (GB)

( * ) Notice: Subject to any disclaimer, the term of this patent is extended or adjusted under 35 U.S.C. 154(b) by 660 days.

(21) Appl. No.: 11/966,055

(22) Filed: Dec. 28, 2007

(65) Prior Publication Data
US 2009/0009349 A1 Jan. 8, 2009

(30) Foreign Application Priority Data

Jul. 2, 2007 (GB) .................................. 0712749.1
Aug. 14, 2007 (GB) .................................. 0715760.5

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)
*H02J 3/14* (2006.01)
*G01R 31/08* (2006.01)

(52) U.S. Cl. .......... 700/295; 700/293; 700/298; 307/31; 324/522; 324/525

(58) Field of Classification Search ................ 700/292, 700/295–298, 293; 702/60; 703/18; 307/31; 323/205, 212, 234; 324/522, 525, 707, 709, 324/713
See application file for complete search history.

(56) References Cited

U.S. PATENT DOCUMENTS

| | | | |
|---|---|---|---|
| 5,642,000 A * | 6/1997 | Jean-Jumeau et al. | 307/31 |
| 6,249,719 B1 * | 6/2001 | Vu et al. | 700/292 |
| 6,690,175 B2 * | 2/2004 | Pinzon et al. | 324/525 |
| 7,136,725 B1 * | 11/2006 | Paciorek et al. | 700/295 |
| 7,149,605 B2 * | 12/2006 | Chassin et al. | 700/295 |
| 7,277,779 B2 * | 10/2007 | Zima et al. | 700/292 |
| 7,356,422 B2 * | 4/2008 | Schweitzer, III | 702/60 |
| 7,398,194 B2 * | 7/2008 | Evans et al. | 703/18 |
| 7,508,224 B2 * | 3/2009 | Williams | 324/707 |
| 7,603,203 B2 * | 10/2009 | Zhang et al. | 700/295 |

(Continued)

FOREIGN PATENT DOCUMENTS

EP 1134867 9/2001

(Continued)

OTHER PUBLICATIONS

Tuan, T.Q. et al., "Emergency load shedding to avoid risks of voltage instability using indicators", IEEE Transactions on Power Systems, vol. 9, Issue: 1, Publication Year: 1994, pp. 341-351.*

(Continued)

*Primary Examiner* — Crystal J Barnes-Bullock
(74) *Attorney, Agent, or Firm* — Pearne & Gordon LLP

(57) ABSTRACT

A method of monitoring voltage stability within an electrical power system comprises the steps of establishing a dynamic power system stability margin based on an operating characteristic of the power system; indicating that the power system has become unstable when the dynamic power system stability margin falls below a predetermined value; and initiating dynamic load shedding and/or restoration depending on stability margin.

5 Claims, 1 Drawing Sheet

U.S. PATENT DOCUMENTS

2004/0010350 A1* 1/2004 Lof et al. .................. 700/292
2008/0077368 A1* 3/2008 Nasle ........................... 703/4
2008/0122414 A1* 5/2008 Solyom et al. ............ 323/247

FOREIGN PATENT DOCUMENTS

SU 699608 A * 11/1979
SU 741370 B * 6/1980
SU 1164824 A * 6/1985

OTHER PUBLICATIONS

Ladhani, S.S. et al., "Under voltage load shedding for voltage stability overview of concepts and principles", IEEE Power Engineering Society General Meeting, vol. 2, Publication Year: 2004, pp. 1597-1602.*

Taylor, C.W., "Concepts of undervoltage load shedding for voltage stability", IEEE Transactions on Power Delivery, vol. 7, Issue: 2, Publication Year: 1992, pp. 480-488.*

Ragu Balanathan et al, A strategy for undervoltage load shedding in power systems, 1998, pp. 1494-1498.

Venkataramana Ajjarapu et al, A novel approach for voltage collapse analysis and control, 1998, pp. 1499-1503.

European Search Report dated Jan. 18, 2008.

* cited by examiner

METHOD OF DETERMINING VOLTAGE STABILITY MARGIN FOR LOAD SHEDDING WITHIN AN ELECTRICAL POWER SYSTEM

BACKGROUND OF THE INVENTION

1. Field of the Invention

This invention relates to a method of determining voltage stability margin within an electrical power system, and an apparatus for monitoring voltage stability limits within an electrical power system and for dynamic control of load shedding and restoration.

2. Description of Related Art

During the large scale power system disturbances, the last line of defense which prevents the voltage collapse is the load shedding at the stations, where the voltage stability margin becomes too low.

These disturbances can lead to the electrical power system becoming unstable which can cause a voltage collapse or blackout.

In order to allow remedial action to be taken it is first necessary to establish when the electrical power system has become unstable.

Conventional monitoring systems compare electrical power system frequency, rate of frequency change, voltage level, rate of voltage decay, power flow levels, with a fixed reference value, and indicate that the power system has become unstable when the voltage, frequency has fallen below the reference value.

Today, the devices monitor the frequency and/or voltage with fixed settings at which the load shedding can be initiated in steps when the frequency or voltage has declined to an agreed-to level.

The disadvantage of such an approach results from the fact that the relation between the voltage level and the stability limit depends very much on the source EMF and the load power factor. Thus shedding the load in steps at fixed settings of voltage does not assure that the system remains stable after operation is completed.

Therefore there is a need to more accurately assess the level of voltage stability within an electrical power system to enable dynamic load shedding and restoration that is based on dynamic estimation of stability margin.

BRIEF SUMMARY OF THE INVENTION

The essence of the invention is the fact that the derivative of the apparent power against the load admittance may be used to determine the stability margin and to initiate the load shedding if the margin becomes too low.

According to a first aspect of the invention there is provided a method of monitoring voltage stability within an electrical power system comprising the steps of:

establishing a dynamic power system stability margin based on an operating characteristic of the power system; and indicating that the power system has become unstable when the dynamic power system stability margin falls below a predetermined value initiating dynamic load shedding and/or restoration depending on stability margin Preferably the method of monitoring voltage stability within an electrical power system includes the steps of:

measuring the power system voltage V, estimating $\phi_S$ source angle with an error not larger than (+/−) 7 deg, measuring the value $\phi_L$ load angle at the bus, establishing a difference between $\phi_S$ source angle and $\phi_L$ load angle ($\Delta$), determining a voltage stability status by calculating derivative of apparent power against the load admittance (dS/dY), determining stability margin (M) in relation to the ratio of load impedance to source impedance, determining Voltage Operating Point (Vop) in relation to $\Delta$, dynamically adjusting difference between $\phi_S$ source angle and $\phi_L$ load angle to continuously update Voltage Operating Point (Vop), determining an amount of load to be shed if the margin (M) becomes too low, and/or initiating controlled load shedding when the difference (DV) between the power system voltage and the voltage operating point is greater than zero and/or stability margin (M) reaches predetermined value, automatically restoring the load when margin (M) and/or DV ratios return to the predetermined set values.

Even if a power system has become unstable it is not always necessary to take remedial action because, for example, the power system may be able to correct itself without intervention.

The foregoing steps establish additional criteria for determining whether to take remedial action, in the form of load shedding, following an indication that the power system has become unstable. The dynamic voltage operating point varies according to changes within the power system, and so is a reflection of the actual status of the power system. Accordingly these steps help to further reduce the incidence of unnecessary intervention to restore stability to a power system, and so reduce the inconvenience caused to users of the power system.

Optionally the method is based on the definition of the voltage stability and calculates the ratio as the derivative of load apparent power against load admittance. Such a factor provides a very good indication of the level of voltage stability within a power system, and so allows for an accurate determination of whether the power system has become unstable.

In a preferred embodiment of the invention the derivative of load apparent power against load admittance $$\left(\frac{dS}{dY}\right)$$

is determined by $$\frac{dS}{dY} = V^2 \cdot \frac{1 - (Z_S Y)^2 - 2(Z_S Y)\left[Y\frac{d(\cos\Delta)}{dY}\right]}{1 + (Z_S Y)^2 + 2(Z_S Y)\cos\Delta}$$

where S is the load apparent power, V is the power system voltage, $Z_S$ is the source impedance, Y is the load admittance given by $Y=1/Z_L$, where $Z_L$ is the load impedance, and $\Delta$ is the dynamic phase angle difference between the source and load of the power system.

This allows for the ready calculation of the derivative of load apparent power against load admittance, and so facilitates the constant updating of this ratio to reflect changes within the power system.

Preferably $\Delta$ is determined dynamically by $$\Delta = \phi_S - \phi_L$$

where $\phi_S$ is the source phase angle and $\phi_L$ is the load phase angle.

In another preferred embodiment of the invention the method includes measuring $\phi_L$ in the power system and determining $\phi_S$ by estimation.

Such steps simplify the calculation of the derivative of load apparent power against load admittance.

In a further preferred embodiment of the invention establishing a dynamic power system stability margin based on an operating characteristic of the power system includes calculating the power system stability margin (Margin$_{Stability}$) according to $$Margin_{Stability} = \frac{Z_L}{Z_S} - 1$$

where, $$\frac{Z_L}{Z_S} = \left(\sqrt{\frac{Z_{L2}}{Z_{L1}}}\right) \frac{M+1}{-(MF+F2) + [(MF+F2)^2 - M^2 + 1]^{0.5}}$$

and, $$F = \cos[0.5(\Delta 1 + \Delta 2)] \quad F_2 = Y\frac{d(\cos\Delta)}{dy}$$

where $Z_{L1}$ & $Z_{L2}$—are initial and final values of load impedance, $\Delta 1$ & $\Delta 2$—are the initial and final values of the angle $\Delta$, F & F2—are intermediate factors to simplify the formula. and M is given by $$M = \frac{dS}{V^2 dY} = \left(\frac{Y}{S}\right)\left(\frac{dS}{dY}\right)$$

Such steps establish a dynamic power system stability margin which accurately reflects the level of stability within the power system and may be used to determine the amount of load to be shed.

Preferably establishing a dynamic voltage operating point based on the operating characteristic of the power system includes calculating the voltage operating point ($V_{OP}$) in relation to S, Y, $Z_S$ according to:

$$V_{OP}^2 = \left(\frac{dS}{dY}\right)\frac{1 + H^2 + 2H\cos\Delta}{1 - H^2 - H\left(2Y \cdot \frac{d(\cos\Delta)}{dY}\right)}$$

where, the factor "H" in the equation denotes the ratio ($Z_S Y$), at which the load shedding ought to be initiated.

Such steps allow the voltage operating point readily to be calculated.

The method of monitoring stability within an electrical power system may further include assigning ($Z_S Y$) a predetermined value. This helps continuously (dynamically) reset the voltage operating point at a suitable level which continues to vary according to changes within the power system because of its dependence on the $\Delta$.

Optionally the method of monitoring voltage stability within an electrical power system further includes the steps of:
determining whether the level of voltage instability within the electrical power system is changing; and
reconnecting one or more loads if the level of voltage instability within the electrical power system is decreasing.

These steps help to return the power system to its normal operating configuration as quickly as possible.

In another preferred embodiment of the invention the method of monitoring voltage stability within an electrical power system further includes the steps of:
determining the rate at which the level of instability within the power system is changing; and
adjusting the extent to which the load is changed according to the rate at which the level of instability within the power system is changing.

The foregoing steps enable the method to adapt to the level and nature of the voltage instability within the power system and modify the amount of load which is shed or reintroduced according to, for example, whether the power system is moving closer towards becoming stable, or moving further away from becoming stable.

In a still further preferred embodiment of the invention the method of monitoring voltage stability within an electrical power system further includes the step of monitoring the load admittance of the power system and only establishing a dynamic voltage system stability margin following detection of a change in the load admittance.

This step prevents any erroneous indication that the power system has become unstable following changes in the source voltage or impedance.

According to a second aspect of the invention there is provided an apparatus for monitoring voltage stability within an electrical power system comprising:
an establishing module to monitor a stability margin based on an operating characteristic of the power system;
an indicator to indicate that the power system has become unstable when the stability margin falls below a predetermined value; and
an initiator to initiate dynamic load shedding and/or restoration depending on stability margin.

Optionally the apparatus includes:
A measuring module to measure the power system voltage V,
An estimating module to estimate $\phi_S$ source angle with an error not larger than (+/−) 7 deg,
A measuring module to measure the value $\phi_L$ load angle at the bus,
An establishing module to establish a difference between $\phi_S$ source angle and $\phi_L$ load angle ($\Delta$),
A determining module to determine a voltage stability status by calculating derivative of apparent power against the load admittance (dS/dY),
A determining module to determine stability margin (M) in relation to the ratio of load impedance to source impedance,
A determining module to determine Voltage Operating Point (Vop) in relation to $\Delta$,
A correcting module to dynamically adjust difference between $\phi_S$ source angle and $\phi_L$ load angle in order to continuously update Voltage Operating Point (Vop),
A determining module to determine an amount of load to be shed if the margin (M) becomes too low, and/or
An initiating to initiate controlled load shedding when the difference (DV) between the power system voltage and the voltage operating point is greater than zero and/or stability margin (M) reaches predetermined value,
A restoration module to automatically restore the load when margin (M) and/or DV ratios return to the predetermined set values.

The apparatus of the invention shares the advantages of the corresponding method steps of the invention.

DETAILED DESCRIPTION OF THE INVENTION

Figure 1:
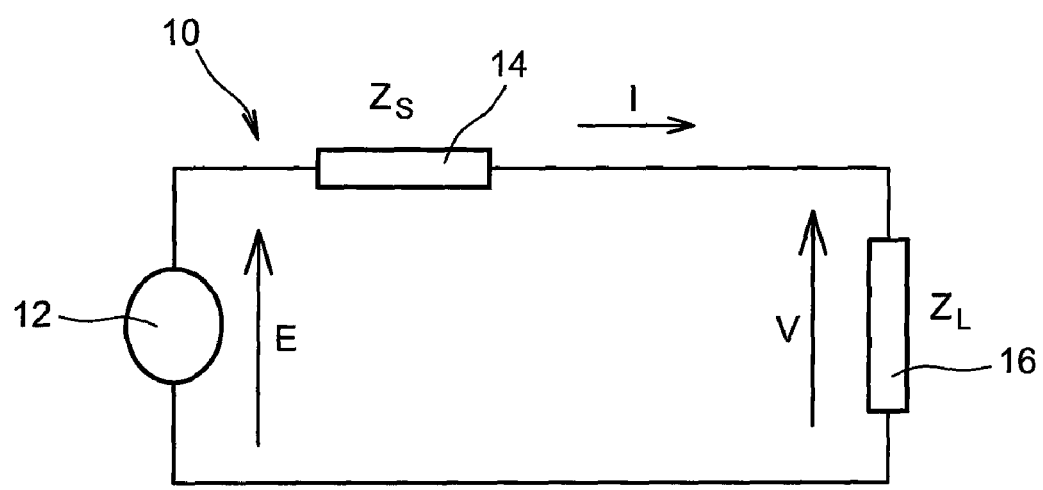
FIG. 1 is a schematic view of an equivalent circuit of an electrical power system.

There now follows a brief description of a preferred embodiment of the invention, by way of non-limiting example, with reference to the accompanying drawing of FIG. 1 which shows a schematic view of an equivalent circuit of an electrical power system.

A method of maintaining stability within an electrical power system according to a first embodiment of the invention includes the steps of:

establishing a dynamic power system stability margin based on an operating characteristic of the power system; and indicating that the power system has become unstable when the dynamic power system stability margin falls below a predetermined value;

initiating dynamic load shedding and/or restoration depending on stability margin.

Basing the dynamic power system stability margin on an operating characteristic of the power system allows the stability margin to adapt to changes within the power system such as, for example, changes in configuration of buses, lines and loads within the power system.

The operating characteristic of the power system is the derivative of load apparent power against load admittance $$\left(\frac{dS}{dY}\right)$$

which is determined by $$\frac{dS}{dY} = V^2 \cdot \frac{1 - (Z_S Y)^2 - 2(Z_S Y)\left[Y\frac{d(\cos\Delta)}{dY}\right]}{1 + (Z_S Y)^2 + 2(Z_S Y)\cos\Delta}$$

where S is the load apparent power, V is the power system voltage, $Z_S$ is the source impedance, Y is the load admittance given by $Y=1/Z_L$, where $Z_L$ is the load impedance, and $\Delta$ is the dynamic phase angle difference between the source and load of the power system.

A Thevenin equivalent circuit 10 of the electrical power system is shown in FIG. 1. The circuit 10 includes a source equivalent electromotive force (EMF) 12, the source impedance 14, and the load impedance 16. The power system voltage V lies across the load impedance 16.

The level of voltage stability limit within the power system is approached as $(Z_S Y)$ becomes close to unity, i.e. close to one. Consequently the derivative of load apparent power against load admittance $$\left(\frac{dS}{dY}\right)$$

is a good indicator of the stability margin of the power system.

$\Delta$ is determined dynamically by $$\Delta = \phi_S - \phi_L$$

where $\phi_S$ is the source phase angle and $\phi_L$ is the load phase angle.

Determining $\Delta$ dynamically means that the derivative of load apparent power against load admittance $$\left(\frac{dS}{dY}\right)$$

continuously reflects the actual status of the power system stability.

The load phase angle $\phi_L$ is measured in the power system, while the source phase angle $\phi_S$ is arrived at by estimation.

One way in which the source phase angle $\phi_S$ may be estimated is by making phasor measurements at different points of the system and comparing those with the phasor measured at the reference point in the system. Another way of estimating relies on the measurement of the line current of the incoming line into the substation and the line parameters (R) and (X) and estimating phase angle by calculating it from the line impedance complex value.

Yet another way in which the source phase angle $\phi_S$ may be estimated is by calculating equivalent source impedance following the Thevenin equivalent circuit principle.

The power system stability margin ($\text{Margin}_{Stability}$) is calculated according to $$\text{Margin}_{Stability} = \frac{Z_L}{Z_S} - 1$$

where $$\frac{Z_L}{Z_S} = \left(\sqrt{\frac{Z_{L2}}{Z_{L1}}}\right)\frac{M+1}{-(MF+F2)+[(MF+F2)^2 - M^2 + 1)]^{0.5}}$$

and, $$F = \cos[0.5(\Delta 1 + \Delta 2)] \quad F_2 = Y\frac{d(\cos\Delta)}{dy}$$

where $Z_{L1}$ & $Z_{L2}$—are initial and final values of load impedance, $\Delta 1$ & $\Delta 2$—are the initial and final values of the angle $\Delta$, F & F2—are intermediate factors to simplify the formula, and M is given by $$M = \frac{dS}{V^2 dY} = \left(\frac{Y}{S}\right)\left(\frac{dS}{dY}\right)$$

The method of maintaining stability within an electrical power system according to the first embodiment of the invention also includes the steps, following an indication that the power system has become unstable, of:

dynamically adjusting difference between $\phi_S$ source angle and $\phi_L$ load angle $\Delta$, determining Voltage Operating Point (Vop) in relation to $\Delta$ and continuously updating Voltage Operating Point (Vop), measuring power system voltage (V), determining the difference between the power system voltage and the voltage operating point (DV) to initiate load shedding the DV is greater than zero, determining an amount of load to be shed based on the margin (M) and initiate load shedding if the margin becomes too low.

These additional steps provide a further check on the status of the power system before initiating remedial action, in the form of load shedding, to maintain stability of the power system. As such these steps further help to reduce the likelihood of remedial action being initiated unnecessarily when, for example, the power system likely to render itself stable without intervention.

The voltage operating point ($V_{OP}$) is calculated in relation to S, Y, $Z_s$ according to:

$$V_{OP}^2 = \left(\frac{dS}{dY}\right)\frac{1 + H^2 + 2H\cos\Delta}{1 - H^2 - H\left(2Y \cdot \frac{d(\cos\Delta)}{dY}\right)}$$

where, the factor "H" in the equation denotes the ratio ($Z_sY$), at which the load shedding ought to be initiated.

In addition, in the embodiment described, ($Z_sY$) is assigned a predetermined value. Typically this depends upon the rate of degrading voltage stability within the system and is a recommended value that is arrived at through extensive testing to establish most optimized rule for setting the voltage operating point.

The first embodiment method also includes determining whether the level of disturbance within the electrical power system is changing; and reconnecting one or more loads if the level of disturbance within the electrical power system is decreasing.

A decreasing level of disturbance within the power system indicates that the power system is moving towards stability, and so it is possible to reintroduce one or more loads into the power system so as to minimise any inconvenience to users of the power system.

The method of the invention according to the first embodiment also includes determining the rate at which the level of disturbance within the power system is changing; and adjusting the extent to which the load is changed according to the rate at which the level of disturbance within the power system is changing.

Such an approach imbues the method with a degree of adaptability in relation to the rate at which the level of disturbance within the power system is changing. A greater rate of change in the level of disturbance can therefore result in a greater change in the load shedding than if the level of disturbance is changing at a lesser rate.

The invention claimed is:

1. A method of monitoring voltage stability within an electrical power system, the method comprising the steps of: establishing a voltage stability margin$_{Stability}$ based on an operating characteristic of the power system including calculating:

$$\text{Margin}_{Stability} = \frac{Z_L}{Z_S} - 1$$

where $Z_L$ is a load impedance connected to a bus of the power system and $Z_s$ is a source equivalent impedance of the power system, such that:

$$\frac{Z_L}{Z_S} = \left(\sqrt{\frac{Z_{L2}}{Z_{L1}}}\right)\frac{M+1}{-(MF+F_2) + [(MF+F_2)^2 - M^2 + 1]^{0.5}}$$

where
a) $Z_{L1}$ and $Z_{L2}$ are, respectively, initial and final values of the load impedance $Z_L$,
b)

$$M = \frac{dS}{V^2 dY} = \left(\frac{Y}{S}\right)\left(\frac{dS}{dY}\right),$$

S being a load apparent power, V being a power system voltage, and Y being the load admittance given by Y=1/$Z_L$, and $$\frac{dS}{dY} = V^2 \cdot \frac{1 - (Z_S Y)^2 - 2(Z_S Y)\left[Y\frac{d(\cos\Delta)}{dY}\right]}{1 + (Z_S Y)^2 + 2(Z_S Y)\cos\Delta}$$

with $\Delta = \phi_s - \phi_L$
c) where $\phi_s$ is the source equivalent impedance phase angle and $\phi_L$ is the load phase angle, F=cos [0.5($\Delta$1+$\Delta$2)], and
d)

$$F_2 = Y\frac{d(\cos\Delta)}{dy}$$

$\Delta$1 and $\Delta$2 are respectively initial and final values of $\Delta$ indicating that the power system has become unstable when the voltage stability margin falls below a predetermined value; and initiating dynamic load shedding and/or restoration depending on the voltage stability margin.

2. The method of monitoring voltage stability according to claim 1, wherein the load phase angle $\phi_L$ is measured at the bus in the power system and the source equivalent impedance phase angle $\phi_S$ is estimated with an error not larger than (+/−) 7 deg.

3. The method of monitoring voltage stability according to claim 1, further comprising a step of determining a voltage operating point at which the voltage stability margin reaches a predetermined value based on an operating characteristic of the power system, said voltage operating point $V_{OP}$ being calculated in relation so S, Y, $Z_S$ according to:

$$V_{OP}^2 = \left(\frac{dS}{dY}\right)\frac{1 + H^2 + 2H\cos\Delta}{1 - H^2 - H\left(2Y \cdot \frac{d(\cos\Delta)}{dY}\right)}$$

where the factor "H" denotes the ratio ($Z_sY$), at which load shedding ought to be initiated, and continuously updating it in relation to changes in difference between the source equivalent impedance phase angle $\phi_S$ and the load phase angle $\phi_L$.

4. A method of maintaining stability within the electrical power system, the method comprising the method of monitoring voltage stability according to any one of claims 1-3 and further comprising a step of automatically restoring the load when the voltage stability margin returns to predetermined set values.

5. An apparatus for monitoring stability within an electrical power system, the apparatus including:
an establishing module to establish a dynamic power system stability margin based on an operating characteristic of the power system, an indicator to indicate that the power system has become unstable when the dynamic power system stability margin falls below a predetermined value, a measuring module to measure the power system voltage V, an estimating module to estimate source equivalent impedance angle φhd s with an error not larger than (+/−) 7 deg, a measuring module to measure a value of the load phase angle $\phi_L$ at a bus of the power system, an establishing module to establish a difference Δ between $\phi_S$ and $\phi_L$, a determining module to determine a voltage stability status by calculating derivative of apparent power against the load admittance $$\left(\frac{dS}{dY}\right),$$

a determining module to determine said stability margin in relation to the ratio of load impedance to source equivalent impedance, a determining module to determine Voltage Operating Point ($V_{OP}$) in relation to Δ, a correcting module to dynamically adjust the difference Δ in order to continuously update Voltage Operating Point ($V_{OP}$), a determining module to determine an amount of load to be shed if said stability margin becomes too low; and/or an initiating module to initiate controlled load shedding when said stability margin reaches predetermined values, a restoration module to automatically restore the load when said stability margin returns to the predetermined set values.

* * * * *

UNITED STATES PATENT AND TRADEMARK OFFICE
CERTIFICATE OF CORRECTION

PATENT NO.         : 7,996,116 B2                                      Page 1 of 1
APPLICATION NO.    : 11/966055
DATED              : August 9, 2011
INVENTOR(S)        : Wiszniewski et al.

It is certified that error appears in the above-identified patent and that said Letters Patent is hereby corrected as shown below:

In Column 9, line 7, please delete "ϕhd s" and insert -- $\varphi_S$ -- therefore.

Signed and Sealed this
Fourth Day of October, 2011

David J. Kappos
*Director of the United States Patent and Trademark Office*